April 25, 1967 W. H. YAKE 3,315,431
FRAMED PANEL AND FASTENING MEANS THEREFOR
Filed Aug. 3, 1964 2 Sheets-Sheet 2

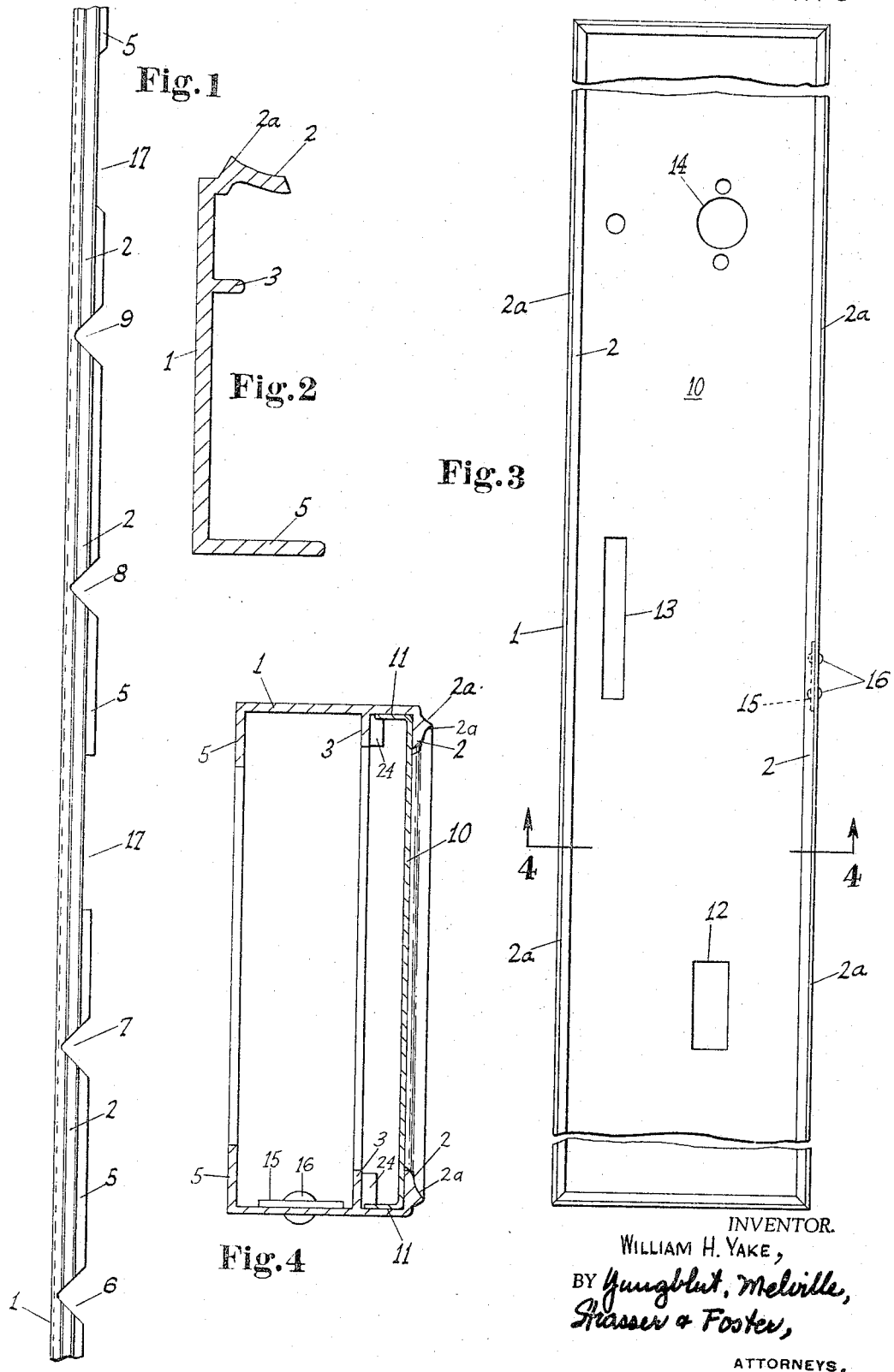
April 25, 1967 W. H. YAKE 3,315,431
FRAMED PANEL AND FASTENING MEANS THEREFOR
Filed Aug. 3, 1964 2 Sheets-Sheet 1
INVENTOR.
WILLIAM H. YAKE,
BY Yungblut, Melville,
Strasser & Foster,
ATTORNEYS.

THIS EDGE ROUNDED
TO PREVENT CUTTING

INVENTOR.
WILLIAM H. YAKE,
BY Yungblut, Melville,
Strasser & Foster,
ATTORNEYS.

United States Patent Office 3,315,431
Patented Apr. 25, 1967

3,315,431
FRAMED PANEL AND FASTENING
MEANS THEREFOR
William H. Yake, Connersville, Ind., assignor to Design
and Manufacturing Corporation, Connersville, Ind., a
corporation of Indiana
Filed Aug. 3, 1964, Ser. No. 387,149
9 Claims. (Cl. 52—614)

This invention relates to rimmed panel structures, and in particular to structures comprising a panel and a frame therefor. Such structures are useful for many purposes, including table tops, bulletin boards and the like; but they are especially useful for the control panels of household appliances, e.g. dish washing machines and others. It is in connection with the provision of control panel structures for dish washing machines that the panel structure will be described in an exemplary embodiment for purposes of disclosure under the statute, it being understood that the invention is not limited to such exemplary use.

It is an object of the invention to provide a novel and advantageous structure for a framed panel as hereinafter set forth.

It is an object of the invention to provide a construction for framed panels which has the advantages of versatility in design, economy in tooling and low cost of assembly.

Specifically, it is an object of the invention to provide a structure comprising a molded or formed panel and an extruded frame element which may be fitted to the panel or to panels of different dimensions in an easy and expeditious manner.

It is an object of the invention to provide novel and advantageous means for fastening the frame element to the panel in a secure and permanent way.

It is an object of the invention to provide a tool for the purpose of fastening the frame member to the panel, all as will later be described. These and other objects of the invention which will be set forth hereinafter or will be apparent to a skilled worker upon reading these specifications, are accomplished in that certain structure and arrangement of parts, and by the practice of that procedure of which the aforesaid exemplary embodiment will now be described. Reference is made to the accompany drawings wherein:

FIG. 1 is a plan view of a frame member notched to form a frame.

FIG. 2 is a sectional view of a frame member showing the configuration thereof.

FIG. 3 is a plan view of a framed panel.

FIG. 4 is a sectional view taken along the section line 4—4 of FIG. 3.

Briefly in the practice of the invention a frame strip is provided which may be of bendable plastic but is more advantageously made of an extruded metal such as, for example, aluminum or aluminum alloy. The panel itself may also be made of metal; but frequently it is desired to provide a panel of insulative or decorative characteristics in which event a panel of plastic or even of post-formable resinous laminate is available. Formable characteristics in the panel element are desirable because the panel must be provided with lips as hereinafter set forth. However, in instances where this is desirable the panel may be formed, drawn or molded with non-planar configurations in its main surface.

As will be more clearly apparent from FIG. 2, the extruded frame member comprises a back portion 1 and certain rib portions 2, 3, and 5 extending substantially normal to the back portion so that the frame member in its preferred embodiment has an E-shaped configuration. In some instances the lower rib portion 5 may be omitted.

Referring to FIG. 1, the frame element, now indicated generally by the numeral 1, can be notched at intervals such as 6, 7, 8 and 9 so that upon bending the back portion of the frame element, it may be formed into a desired polygonal figure with the ribs mitered at the corners.

Figure 6:
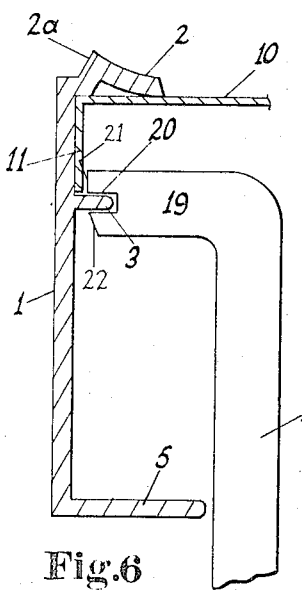
FIGS. 6 and 7 are partial sectional views of the combination of frame member and panel showing the position of the tool as initially engaged with a portion of the frame member.

As will be best appreciated from FIGS. 4 and 6, the panel element has a general panel surface 10 and edge lips 11 extending substantially normal to the general surface. The edge lips are of such a depth as will permit them to lie against the back portion of the frame element between the ribs 2 and 3 for a purpose later set forth. The general surface of the panel member may be provided with such orifices 12, 13 and 14 as will permit operating, control or indicating elements of the appliances to extend through the general surface or to be mounted thereon as desired. The nature and location of the control, operating or indicating elements forms no limitation upon the invention. It may be pointed out that if the panel element is made from translucent plastic it may be utilized in connection with illuminating means located behind it, to indicate whether the mechanism is in the "on" or "off" condition.

The frame is assembled about the panel element as will be clear from FIG. 3; and meeting ends of the frame strip may be fastened together in any suitable way as by the use of a strip 15 and rivets or other fastening means 16.

Figure 9:
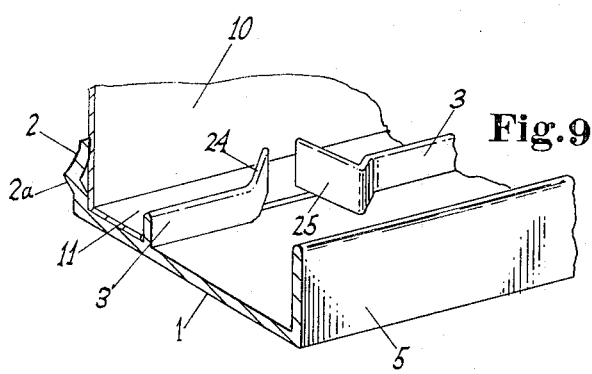
FIG. 9 is a partial perspective view illustrating the nature of the means whereby the panel is locked to the frame.

If necessary, rib portions of the frame element may be cut away or notched, as shown at 17 in FIG. 1, to clear operating elements of the appliance. It is also a feature of the invention that in the extrusion of the frame element the upper rib 2 may be fluted or otherwise configured as at 2a in FIGS. 4, 6 and 9 for a decorative effect.

Figure 5:
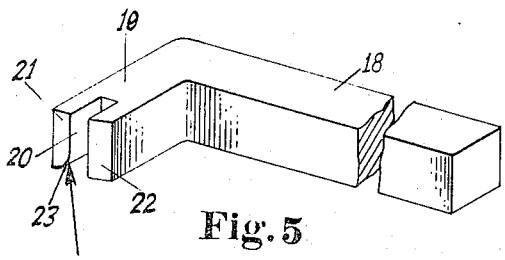
FIG. 5 is a perspective view of the tool employed for fastening the frame member to the panel.

FIG. 4 indicates that when in assembled relationship the panel surface 10 will lie beneath the top rib 2 of the frame, with the panel lips 11 lying against the frame back in the space between the ribs 2 and 3. It remains to lock the panel element to the frame element. This is easily and quickly accomplished by the use of a tool such as that shown in FIG. 5. The tool comprises an elongated handle portion 18 having a turned-over or angularly related end part 19. The end part is notched as at 20. Edge portions 21 and 22 of the end part of the tool lie at a sharp angle to the notch 20 and provide cutting edges. It has been found advisable to round one corner of the notch inner surface as at 23 in FIG. 5 to prevent cutting at that position.

Figure 7:
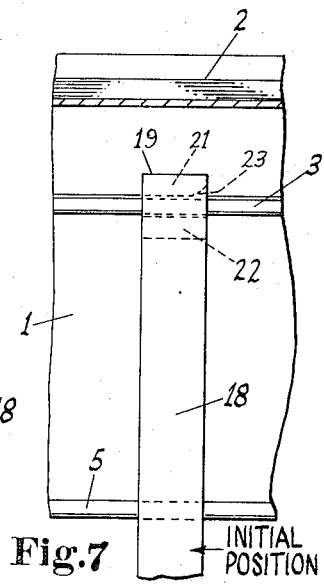
Figure 8:
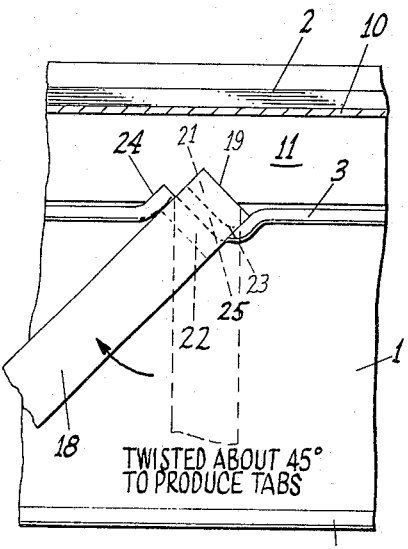
FIG. 8 is an elevational view with parts in section showing the result of the operation of the tool after engagement.

The tool will be engaged with the center rib 3 of the frame element as indicated in FIGS. 6 and 7, the rib 3 lying within the notch 20. When this engagement has been effected, and the end of the bent-over part of the tool brought adjacent to the lip 11 of the panel element, the tool will be rotated about its turned-over part through an arc of about 45° or so as illustrated in FIG. 8. Several effects result from this operation. The first effect is that the body of the central rib 3 will be severed transversely. Next, two tabs will be formed. The first of these tabs is indicated at 24 and constitutes a portion of the rib 3 bent toward the general panel surface 10 in such fashion as to engage the lip 11. The second tab is indicated in FIG. 8 at 25, and it will be noted that it has a first portion bent away from the lip 11 and a second or reversely bent portion which at least partially over-lies the lip 11. In the formation and deflection of the tabs 24 and 25 the substance of the rib 3 will tear along or near the line of juncture of the rib 3 with the back portion of the frame element so that in the preferred construction the portions of the tabs underlying the lips 11 of the panel element tightly engage the inner surfaces of these lips not only securing the panel element firmly to the frame element, but also eliminating any play between the frame element and the panel element.

It is an advantage of the invention that the locking tabs may be varied in number and placement as desired by the operator, there being as many of the locking structures as are required not only for the secure attachment of the frame and panel elements but also for the purpose of causing the frame element to conform closely to the contour of the panel element. Since the frame element as such is characterized by some resilient transverse bendability, it follows that the panel element need not necessarily have rectilinear side portions.

Modifications may be made in the invention without departing from the spirit thereof.

The embodiments of the invention in which an exclusive property or privilege is claimed are defined as follows:

1. The combination of a frame member characterized by a back portion and at least a first and a second rib spaced from each other and extending substantially normal to and substantially along the length of the back portion and a panel element having a general panel surface and angularly related lips at certain, at least, of its edge portions, said lips lying entirely between said first and second ribs of the frame element, said first rib overlying a portion of said general panel surface, said second rib being distorted so as to form tab means in part at least overlying and engaging the lips of the panel element, said tabs being formable substantially anywhere along the length of said second rib.

2. The structure claimed in claim 1, wherein the said frame element is formed by extrusion from a material capable of being torn and bent.

3. The structure claimed in claim 2, wherein the frame element is an extruded shape formed of a material chosen from a class consisting of aluminum and its alloys.

4. The structure claimed in claim 2, wherein the said frame element is notched at intervals and bent as to its back portion so as to cause said frame element to conform to the edges of the panel element.

5. The structure claimed in claim 3, wherein the said frame element is substantially E-shaped in cross section.

6. The structure claimed in claim 5, wherein an edge rib of said frame element has a non-rectilinear cross-section for decorative purposes.

7. The structure claimed in claim 5, wherein the panel element is formed of sheet metal.

8. The structure claimed in claim 5, wherein the panel element is fastened to the said frame element at a plurality of points, each of said points involving two tab elements formed by severing the substance of the said second rib, both of said tabs being bent at an angle to said rib so as to overlie the lip of the panel element at least in part.

9. A tool for the purpose described comprising an elongated handle adapted to serve as a lever, an angularly related part adjacent one end of the handle and having an outer end, said outer end having a substantially rectangular cross section, the said outer end being notched to receive a rib and sever and configure it to form two tabs, said outer end terminating in surfaces lying at a sharp angle to said notch and one corner portion of the inner surface of said notch is rounded to prevent cutting.

References Cited by the Examiner
UNITED STATES PATENTS

| | | | |
|---|---|---|---|
| 1,854,144 | 4/1932 | Shrosbree et al. | 52—656 |
| 2,126,544 | 8/1938 | Everhard | 52—658 |
| 2,805,907 | 9/1957 | Oom | 52—614 |
| 2,890,462 | 6/1959 | Ross | 29—513 X |
| 2,952,496 | 9/1960 | Braal et al. | 52—614 |
| 3,050,160 | 8/1962 | Chesser | 29—513 |
| 3,190,250 | 6/1965 | Hinden | 30—165 X |

FRANK L. ABBOTT, *Primary Examiner.*

M. O. WARNECKE, *Assistant Examiner.*